(12) United States Patent
Every et al.

(10) Patent No.: US 8,798,289 B1
(45) Date of Patent: Aug. 5, 2014

(54) ADAPTIVE POWER SAVING FOR AN AUDIO DEVICE

(75) Inventors: Mark Every, Palo Alto, CA (US);
Carlos Avendano, Campbell, CA (US);
Ye Jiang, Sunnyvale, CA (US); Ludger Solbach, Mountain View, CA (US);
Carlo Murgia, Mountain View, CA (US)

(73) Assignee: Audience, Inc., Mountain View, CA (US)

(*) Notice: Subject to any disclaimer, the term of this patent is extended or adjusted under 35 U.S.C. 154(b) by 652 days.

(21) Appl. No.: 12/536,374

(22) Filed: Aug. 5, 2009

Related U.S. Application Data

(60) Provisional application No. 61/086,453, filed on Aug. 5, 2008.

(51) Int. Cl.
*H04B 15/00* (2006.01)

(52) U.S. Cl.
USPC .......... 381/94.1; 381/57; 381/71.1; 381/94.5; 704/226

(58) Field of Classification Search
CPC ........... H03G 3/24; H03G 3/32; H03G 3/345; H03G 3/348; G10L 21/02; G10L 21/0208; G10L 21/0216; G10L 21/0224; G10L 21/0232; G10L 2021/02161; G10L 2021/02165; G10K 11/178; G10K 2210/3045; G10K 2210/3049
USPC ............... 381/71.1–71.14, 94.1–94.9, 55, 58, 381/323, 74, 123, 57; 704/226–229, 233; 700/94; 379/406.01–406.16
See application file for complete search history.

(56) References Cited

U.S. PATENT DOCUMENTS

| | | | | |
|---|---|---|---|---|
| 5,793,863 | A * | 8/1998 | Hashimoto | 455/570 |
| 6,144,937 | A * | 11/2000 | Ali | 704/233 |
| 6,230,123 | B1 * | 5/2001 | Mekuria et al. | 704/226 |
| 7,203,640 | B2 * | 4/2007 | Murase et al. | 704/210 |
| 7,826,631 | B2 * | 11/2010 | Fischer et al. | 381/312 |
| 2002/0037088 | A1 * | 3/2002 | Dickel et al. | 381/317 |
| 2002/0141598 | A1 * | 10/2002 | Vayrynen | 381/71.1 |
| 2005/0069161 | A1 * | 3/2005 | Kaltenbach et al. | 381/312 |
| 2009/0074199 | A1 * | 3/2009 | Kierstein et al. | 381/71.6 |

FOREIGN PATENT DOCUMENTS

WO WO 2007113487 A1 * 10/2007

* cited by examiner

*Primary Examiner* — Xu Mei
(74) *Attorney, Agent, or Firm* — Carr & Ferrell LLP

(57) ABSTRACT

An adaptive power control monitors the noise level within a primary acoustic signal and compares the noise level to a threshold. If the noise level is lower than the threshold, a noise suppression system is deactivated and bypass filtering and cross fading are enabled. If the noise level is higher than the threshold, the noise suppression system is activated.

23 Claims, 7 Drawing Sheets

ADAPTIVE POWER SAVING FOR AN AUDIO DEVICE

CROSS-REFERENCE TO RELATED APPLICATIONS

The present application claims the priority benefit of U.S. provisional application Ser. No. 61/086,453 filed Aug. 5, 2008 and entitled "Enhanced Adaptive Power Control," which is incorporated herein by reference.

BACKGROUND OF THE INVENTION

1. Field of the Invention

The present invention relates generally to audio processing. More specifically, the present invention relates to controlling power saving methods in audio signal processing.

2. Related Art

Many audio devices such as cell phones and other hand held devices incorporate technology for processing audio signals. Most hand held audio devices are limited in power supply, often provided only by a rechargeable battery. Hence, though hand held devices may incorporate technology to receive, process and output audio, power is an important and limited resource. When an audio device power supply is depleted, the power supply must be recharged or replaced.

What is needed is an audio system that is able to conserve power without significantly compromising audio quality of the device.

SUMMARY OF THE INVENTION

Embodiments of the present technology allow an audio device to transition to one or more lower power modes, thereby saving power without compromising audio quality output of the device.

An embodiment for adaptive power control monitors noise level within a primary acoustic signal and compares the noise level to a threshold. If the noise level is lower than the threshold, a noise suppression system is deactivated and bypass filtering and cross fading are enabled. If the noise level is higher than the threshold, the noise suppression system is kept active.

An embodiment includes a machine readable medium with a program. The program provides instructions for a method for conserving power. The method can monitor noise level within a primary acoustic signal and compare the noise level to a threshold. If the noise level is lower than the threshold, a noise suppression system is deactivated and bypass filtering and cross fading are enabled. If the noise level is higher than the threshold, the noise suppression system is kept active.

In an embodiment, a system for adaptive power control includes a primary microphone, a noise suppression module, and a power module. The primary microphone is configured to receive an acoustic signal. The noise suppression module is configured to be executed by a processor to receive a noise estimate, and may process the acoustic signal based on the noise estimate. The power module is configured to be executed by a processor to deactivate the noise suppression module based on the noise estimate.

Embodiments of the present technology may further include systems and computer-readable storage media. Such systems can perform methods associated with controlling adaptivity of noise suppression. The computer-readable media has programs embodied thereon. The programs may be executed by a processor to perform methods associated with controlling adaptivity of noise suppression.

DETAILED DESCRIPTION OF EXEMPLARY EMBODIMENTS

The present technology provides methods and systems for adapting a low power operating mode in a mobile device. In some embodiments, noise suppression and other functions may be deactivated to conserve power in the mobile device based on a noise estimate. The noise suppression and other systems may be turned off or on when under certain conditions or at particular times, for example when an estimated noise level satisfies particular conditions. An audio device may operate in a normal power mode when a noise estimate for received acoustic signals is above a threshold. The audio device may operate in a low power mode when a noise estimate for received acoustic signals is below a threshold. The present technology may also utilize an ultra low power mode, which may process a microphone signal in the time domain.

An embodiment for adaptive power control in an audio device monitors noise level within a primary acoustic signal and compares the noise level to one or more thresholds. In some embodiments, the threshold compared to the noise estimate depends on the state of the audio device. If the noise level is lower than a threshold, a noise suppression system may be deactivated, and bypass filtering and cross fading may be enabled. If the noise level is higher than a threshold, the noise suppression system may be activated.

Figure 1:
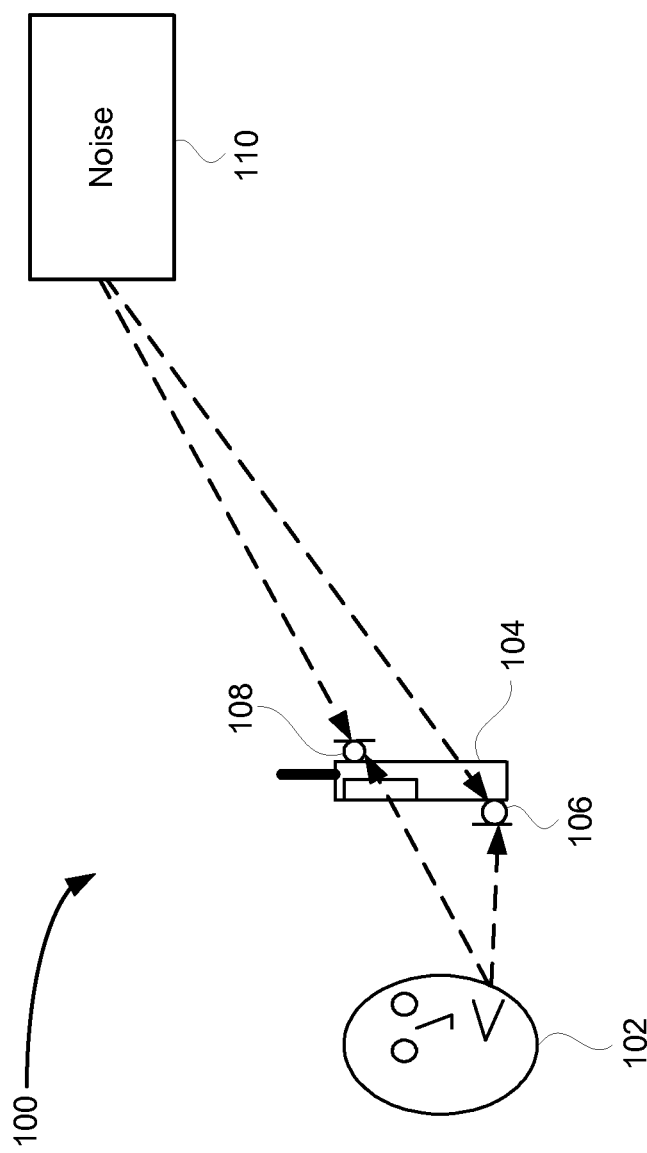
FIG. 1 is a block diagram of an exemplary environment for practicing embodiments of the present technology.

FIG. 1 is a block diagram of an exemplary environment 100 for practicing embodiments of the present technology. The environment 100, as depicted, includes a user 102, an audio device 104, and a noise source 110. It is noteworthy that there may be several noise sources in the environment 100 similar to the noise source 110. Furthermore, although the noise source 110 is shown coming from a single location in FIG. 1, the noise source 110 may include any sounds from one or more locations different than the user 102, and may include reverberations and echoes. The noise source 110 may be stationary, non-stationary, or a combination of both stationary and non-stationary noise sources.

The audio device 104 may include a microphone array. In exemplary embodiments, the microphone array may comprise a primary microphone 106 relative to the user 102 and a secondary microphone 108 located a distance away from the primary microphone 106. The primary microphone 106 may be located near the mouth of the user 102 in a nominal usage position. While embodiments of the present technology will be discussed with regards to the audio device 104 having two microphones (i.e., the primary microphone 106 and the secondary microphone 108), alternative embodiments may contemplate any number of microphones or acoustic sensors within the microphone array. Additionally, the primary microphone 106 and/or the secondary microphone 108 may include omni-directional microphones in accordance with some embodiments.

Figure 2:
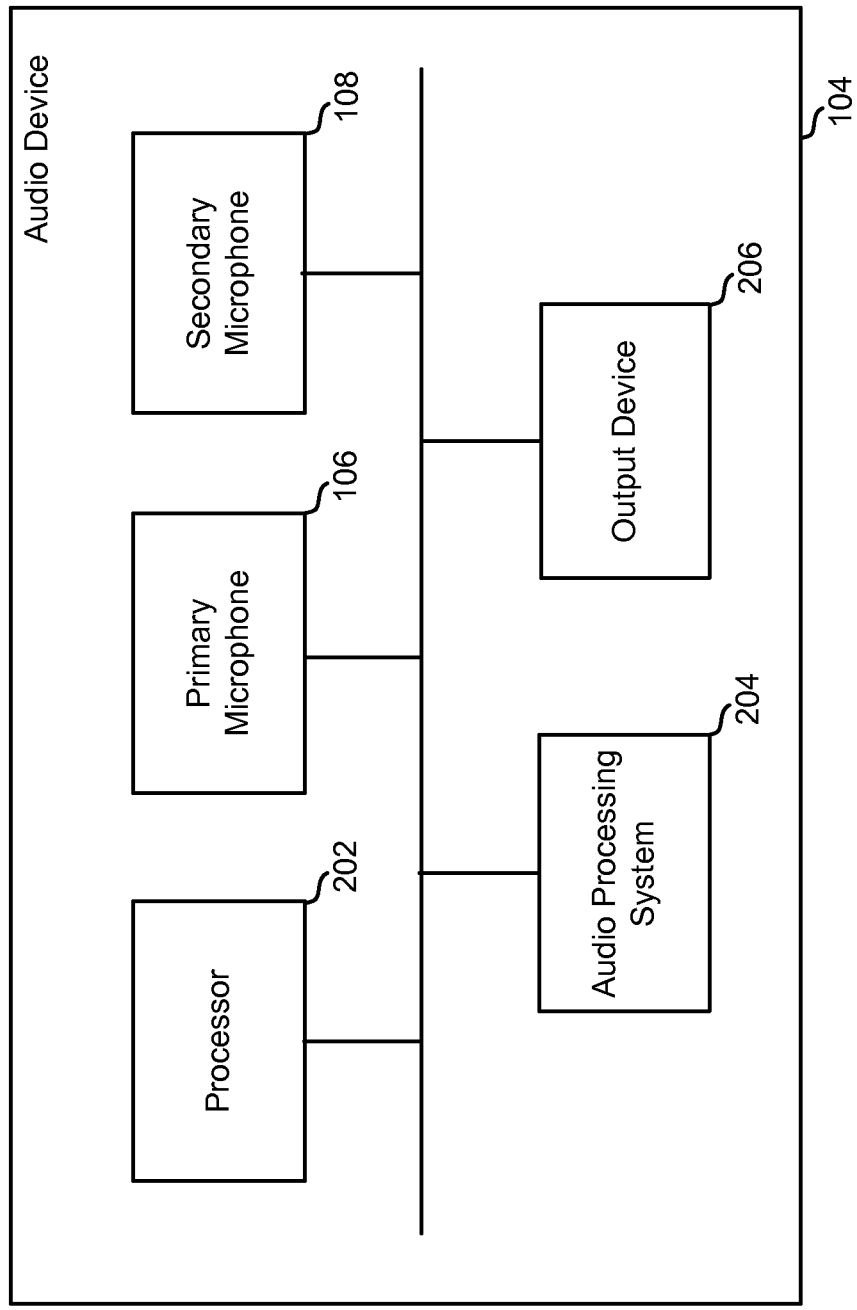
FIG. 2 is a block diagram of an exemplary audio device.

FIG. 2 is a block diagram illustrating the exemplary audio device 104 in further detail. As depicted, the audio device 104 includes a processor 202, the primary microphone 106, the secondary microphone 108, an audio processing system 204, and an output device 206. The audio device 104 may comprise further components (not shown) necessary for audio device 104 operations. For example, the audio device 104 may include memory (not shown) that comprises a computer readable storage medium. Software such as programs or other executable code may be stored on a memory within the audio device. The processor 202 may include and may execute software and/or firmware that may execute various modules described herein. The audio processing system 204 will be discussed in more detail in connection with FIG. 3.

In exemplary embodiments, the primary and secondary microphones 106 and 108 are spaced a distance apart. This spatial separation allows various differences to be determined between received acoustic signals. These differences may be used to determine relative locations of the user 102 and the noise source 110. Upon receipt by the primary and secondary microphones 106 and 108, the acoustic signals may be converted into electric signals. The electric signals may, themselves, be converted by an analog-to-digital converter (not shown) into digital signals for processing in accordance with some embodiments. In order to differentiate the acoustic signals, the acoustic signal received by the primary microphone 106 is herein referred to as the primary signal, while the acoustic signal received by the secondary microphone 108 is herein referred to as the secondary signal.

The primary microphone 106 and the secondary microphone 108 both receive a speech signal from the mouth of the user 102 and a noise signal from the noise source 110. These signals may be converted from the time-domain to a frequency-domain, and be divided into frequency sub-bands, as described further herein. The total signal received by the primary microphone 106 (i.e., the primary signal c) may be represented as a superposition of the speech signal s and of the noise signal n as $c=s+n$. In other words, the primary signal is a mixture of a speech component and a noise component.

Due to the spatial separation of the primary microphone 106 and the secondary microphone 108, the speech signal received by the secondary microphone 108 may have an amplitude difference and a phase difference relative to the speech signal received by the primary microphone 106. Similarly, the noise signal received by the secondary microphone 108 may have an amplitude difference and a phase difference relative to the noise signal received by the primary microphone 106. These amplitude and phase differences can be represented by complex coefficients. Therefore, the total signal received by the secondary microphone 108 (i.e., the secondary signal f) may be represented as a superposition of the speech signal s scaled by a first complex coefficient σ and of the noise signal n scaled by a second complex coefficient ν as $f=\sigma s+\nu n$. Put differently, the secondary signal is a mixture of the speech component and noise component of the primary signal, wherein both the speech component and noise component are independently scaled in amplitude and shifted in phase relative to the primary signal. It is noteworthy that a diffuse noise component may be present in both the primary and secondary signals. In such a case, the primary signal may be represented as $c=s+n+d$, while the secondary signal may be represented as $f=\sigma s+\nu n+e$.

The output device 206 is any device which provides an audio output to users such as the user 102. For example, the output device 206 may comprise an earpiece of a headset or handset, or a speaker on a conferencing device. In some embodiments, the output device 206 may also be a device that outputs or transmits audio signals to other devices or users.

The audio processing system can be embodied as software that is stored on memory or other electronic storage and can be executed by processor 202. The audio processing system 204 may also be embodied as firmware. The audio processing system may provide acoustic echo cancellation (AEC) and noise suppression. As a result, an acoustic signal sent from audio device 104 to a far-end environment, for example another audio device in communication with audio device 104 over a communication network, comprises noise suppression as well as reduced or eliminated echo from speaker leakage.

In operation, the acoustic signals received from the primary and secondary microphones 106 and 108 and a far-end acoustic signal x(t) are converted to electric signals and processed. The processing may mimic the frequency analysis of the cochlea (i.e., cochlear domain) simulated by a filter bank. In one embodiment, the frequency analysis module 402 separates the acoustic signals into frequency bands or sub-bands. Alternatively, other filters such as short-time Fourier transform (STFT), Fast Fourier Transform, Fast Cochlea transform, sub-band filter banks, modulated complex lapped transforms, cochlear models, a gamma-tone filter bank, wavelets, or any generalized spectral analysis filter/method, can be used for the frequency analysis and synthesis.

Because most sounds (e.g., acoustic signals) are complex and comprise more than one frequency, a sub-band analysis on the acoustic signal may be performed to determine what individual frequencies are present in the acoustic signal during a frame (e.g., a predetermined period of time). According to one embodiment, the frame is 5-20 ms long (e.g., 40 to 160 samples for a system audio sampling rate of 8000 Hz). Alternative embodiments may utilize other frame lengths. Data may be pushed through the audio processing system 204 in these frames (i.e., blocks of buffered samples).

The output of the frequency analysis includes a plurality of waveforms. In normal power mode, the envelopes of the far-end acoustic signal are used to predict the echo envelopes that will be present in the near-end acoustic signal (e.g., primary acoustic signal).

Acoustic echo cancellation (AEC) and noise suppression can be achieved in a variety of ways. An exemplary set of modules for determining AEC and noise suppression are discussed below with respect to FIG. 3. Another exemplary methodology for determining AEC and noise suppression and processing an audio signal is discussed in U.S. patent application Ser. No. 12/435,322, filed on May 4, 2009, entitled "Self Calibration of Envelope-Based Acoustic Echo Cancellation," U.S. patent application Ser. No. 11/441,675 filed May 25, 2006 and entitled "System and Method for Processing an Audio Signal," and U.S. patent application Ser. No. 12/080, 115 filed Mar. 31, 2008 and entitled "System and Method for Providing Close Microphone Adaptive Array Processing," all of which the disclosures are incorporated herein by reference.

Figure 3:
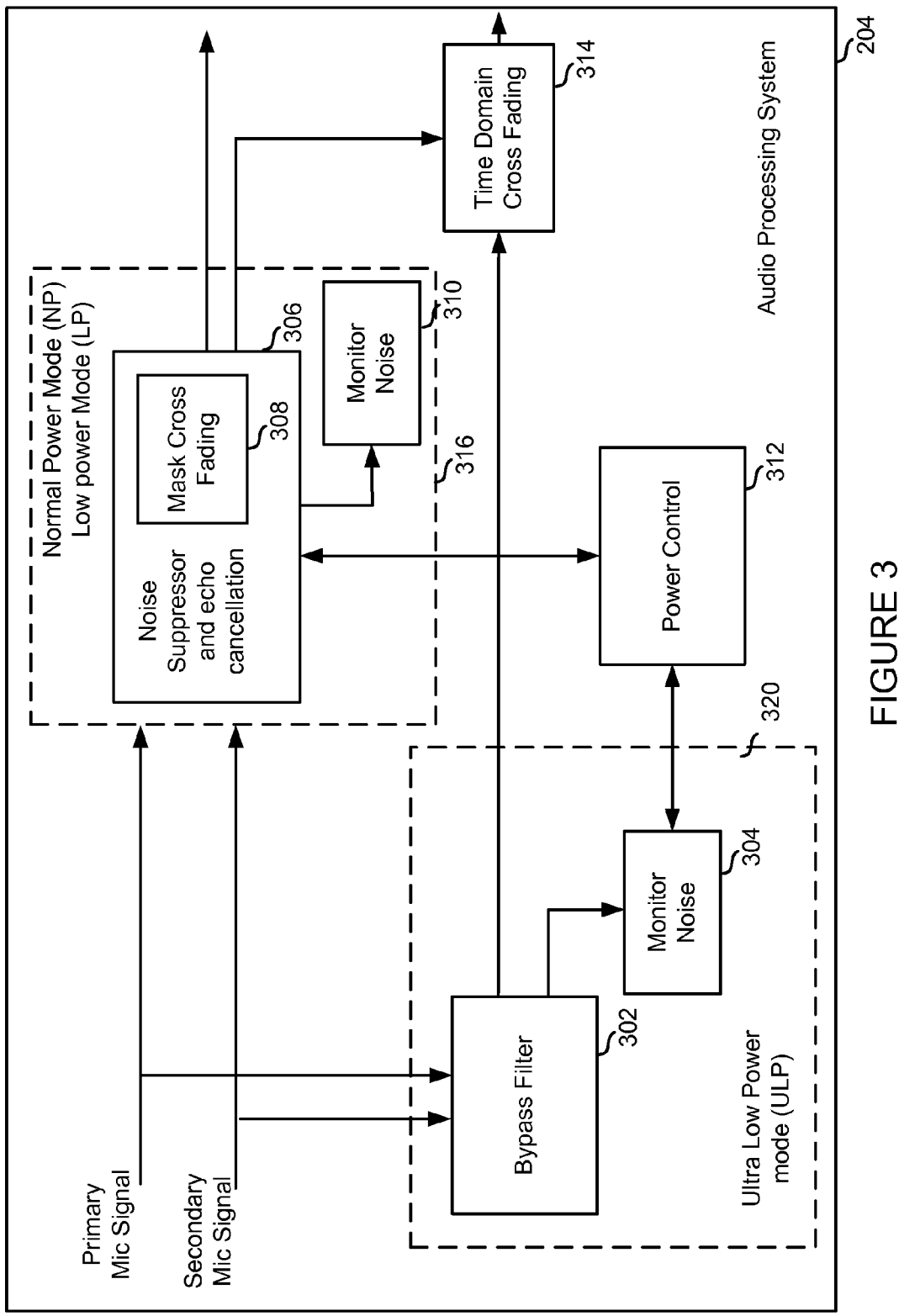
FIG. 3 is a block diagram of an exemplary audio processing system.

FIG. 3 is a block diagram of an exemplary audio processing system. In some embodiments, the audio processing system of FIG. 3 provides more detail for audio processing system 204 of FIG. 2.

FIG. 3 illustrates an embodiment of how different power level modes may be integrated into an audio processing system. The enabling of certain modules and disabling of other modules may be coordinated by power control unit 312. During an ultra low power mode (ULP), the audio processing engine 320 may process a primary microphone signal in the time domain. The ULP mode may filter the primary microphone signal using bypass filter 302. The bypass filter 302 may approximately match a magnitude and phase response of a filter module in power control 312, in order to: (i) minimize differences in speech timbre between power modes, (ii) avoid speech modulation/artifacts during cross-fade (CF) arising from constructive/destructive interference of speech frequency components, and (iii) ensure identical latency for different power modes. In some embodiments, the bypass filter can be designed to be low-cost to keep the overall ultra low power mode power consumption to a minimum. For example, the bypass filter 302 is implemented with a fixed delay followed by a low-order IIR filter.

Bypass filter 302 outputs a filtered primary microphone signal to monitor noise module 304. The noise monitoring block may estimate the noise floor power in the bypass filtered primary microphone signal and/or secondary microphone signal, and compares it against a noise threshold. If the threshold is exceeded, then the audio processing system may transition to low power mode or normal power mode.

The noise monitoring module 304 may estimate noise in several ways. A stationary noise estimate may be determined using a stationary noise estimator, such as minimum statistical tracking. A non-stationary noise estimate may be determined using a broadband inter-aural level difference (ILD), which may be determined, generally speaking, as the ratio of the time-domain frame energies computed from the primary and secondary microphone signals, respectively, in a frame. The primary and secondary microphone signals may be filtered using bypass filter 302 prior to computing a broadband ILD. In close microphone configurations, the noise estimate may be estimated in ultra low power mode using broad band array processing. Array Processing is discussed in more detail in U.S. patent application Ser. No. 12/080,115, filed Mar. 31, 2008, and is incorporated herein by reference.

In some embodiments, the audio processing system may utilize time delay when processing signals in time domain to avoid signal discontinuity. A delay line can be used to match the delay of the cochlear transform and reconstruction module sub-system, or delays caused by other modules, when cross fading. The delay may be implemented in any module, including the bypass filter 302 and monitor noise module 304.

The power control 312 may be used for outputting a mode signal and for controlling which modules in the system should be enabled in the respective mode, such as for example ultra low power (ULP) mode, low power (LP) mode and normal power (NP) mode. In some embodiments, the power control 312 may monitor the noise estimate and control a transfer to a different power mode based on the level of the noise estimate. The power control 312 may include one or more filters configured to replicate cochlear linear transforms, a comparator module for comparing noise estimates to a threshold, a mode signal output, and other modules.

Noise estimate module 304 may process and/or analyze the ILD noise estimate. In some embodiments, if the ILD noise estimate is beneath a certain threshold, ildThresh, for greater than some minimum duration (i.e., until a counter expires), then the noise estimate tends towards the primary mic energy $\tilde{E}_p[m]$. The counter is reset if the ILD exceeds ildThresh. The parameter ildThresh and the counter are tuned heuristically to obtain a suitable trade-off between false triggering on near-end speech of a transition to a higher power mode vs. false rejects (a higher power mode is not enabled when it should be) in the presence of non-stationary noise sources. If the ILD-based noise estimate or the stationary noise estimate in monitor noise module 304 crosses a noise threshold, the power control module 312 may be informed.

Time domain cross fading module 314 cross fades between the bypass-filtered primary microphone signal in ultra low power mode and the output of the noise suppressor and echo cancellation module (NS) 306 during low power mode or normal power mode. To avoid discontinuities in the output of the system, e.g. clicks, the cross-fade (CF) module 314 is used to fade-in the output of the NS when the NS is switched on during normal power mode. Similarly, the cross fading module fades-out the output of the NS during a transition to ultra low power mode. Such discontinuities may arise from a slight mismatch between the bypass filter and minimum signal path (MSP) frequency responses, and also from the convergence time after initialization to steady-state for the bypass filter or NS. In some embodiments, a cross fade time can be about 2 seconds. The CF output may be a weighted linear summation of the bypass filter output, $x_{bf}[n]$, and the NS output, $x_{NS}[n]$:

$$x[n] = a[n] \cdot x_{NS}[n] + (1 - a[n]) \cdot x_{bf}[n]$$

$$n = n_0, n_0+1, \ldots, n_0+N_{cf}$$

$$a[n] = (n - n_0)/N_{cf} \ldots \text{(fade-in NS)}$$

$$a[n] = 1 - (n - n_0)/N_{cf} \ldots \text{(fade-out NS)} \quad (18)$$

$N_{cf}$ is the cross-fade length in samples, and $n_0$ is the first sample of the CF. The cross fading module may inform the control logic unit when the CF has completed. Since the weights applied to $x_{bf}[n]$ and $x_{NS}[n]$ sum to unity, and the speech signal is present in both outputs, the speech output from the cross fading module maintains a constant level before, after and during the cross fading interval.

When in normal power mode or low power mode (see 316 in FIG. 3), the noise suppressor and echo cancellation module 306 is activated along with monitor noise module 310. Noise suppressor and echo cancellation module 306 may include a mask cross fading module 308. Normal power mode and low power mode may process both a primary microphone signal and secondary microphone signal. Normal power mode is discussed in more detail with respect to FIG. 4. Low power mode is discussed in more detail with respect to FIG. 5.

Figure 4:
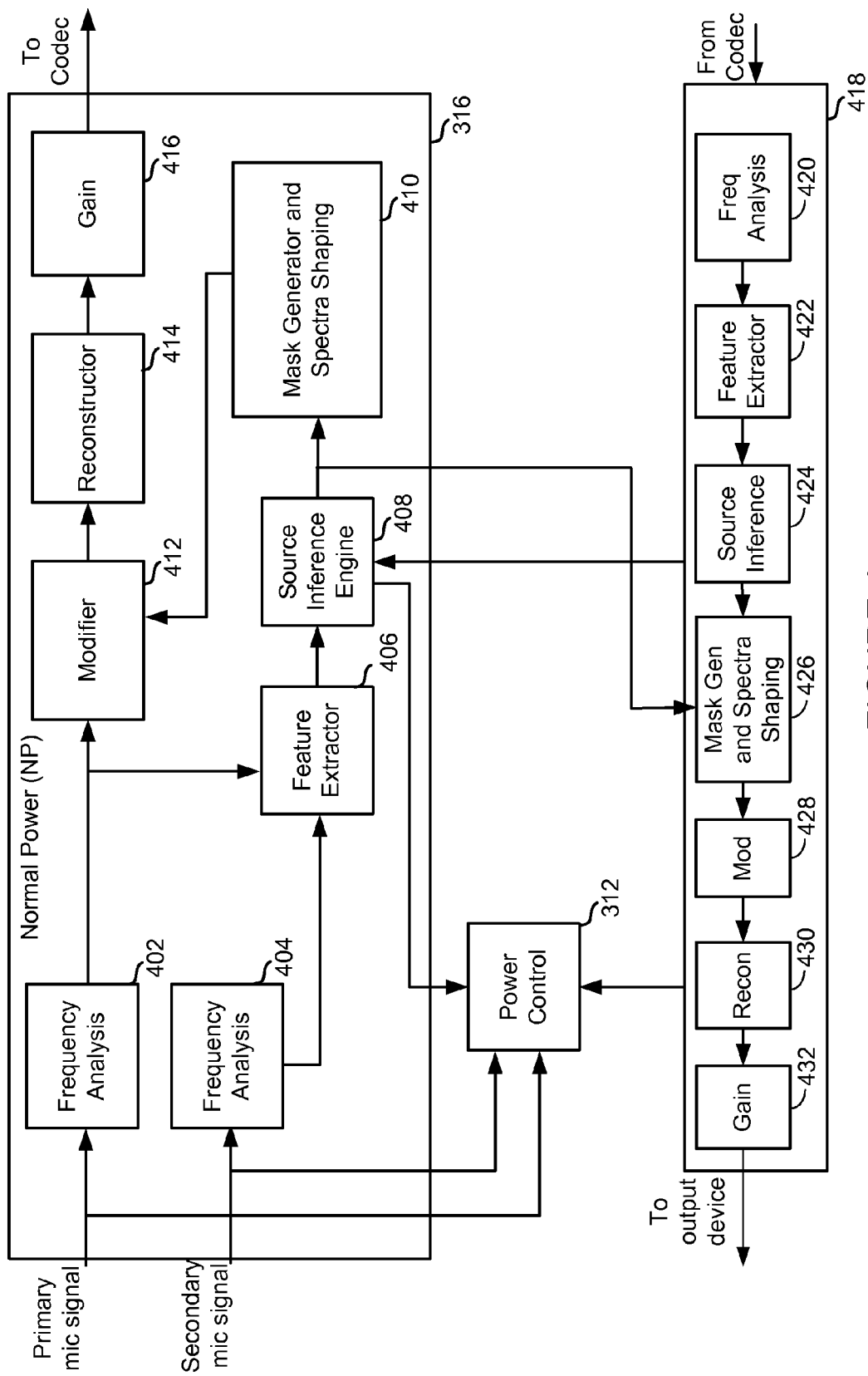
FIG. 4 is a block diagram of an exemplary normal power module.

FIG. 4 is a block diagram of an exemplary normal power module 316. Normal power mode utilizes frequency analysis modules 402 and 404 for a primary microphone signal and secondary microphone signal, respectively, feature extractor 406, source inference engine 408, mask generator and spectra shaping module 410, modifier 412, reconstructor 414, and gain 416. Other modules may be used in addition to those illustrated in FIG. 4.

Frequency analysis modules 402 and 404 perform frequency analysis for a received primary microphone signal and secondary microphone signal. The analysis may include applying a fast cochlear transform (FCT) to the received signal to mimic the behavior of the human cochlea. The output of frequency analysis modules 402 and 404 is provided to feature extractor 406.

Feature extractor 406 may determine noise estimates and energy values for the transformed signals in one or more sub-bands. Feature information is then provided to source inference engine 408 for echo cancellation processing. Source inference engine 408 may determine a stationary sub-band noise estimate, generate an echo cancellation mask and provide the mask to mask generator and spectra shaping module 410. In some embodiments, mask generator and spectra shaping module 410 may generate an echo cancellation mask. An example of echo cancellation as performed by mask generator and spectra shaping module 410 is described in U.S. patent application Ser. No. 12/077,436, filed on Mar. 18, 2008 and titled "System and Method for Envelope-Based Acoustic Echo Cancellation," incorporated herein by reference.

Mask generator and spectra shaping module 410 receives signal information from source inference engine 408 and performs noise suppression and echo cancellation on the signals. The noise suppression, in full power mode, may be performed on a sub-band basis. The echo cancellation may be performed by identifying sub-bands that are dominated by echo and applying echo cancellation processing to the sub-bands. In some embodiments, noise estimate updates are not applied to sub-bands identified as being echo dominant.

In normal power mode, any information that is computed in the analysis path is available to the power control 312 at no additional computational cost. Since an analysis in the FCT domain is performed within the mask generator and spectra shaping module 410, and a sub-band non-stationary noise estimate is obtained, this noise is used to detect when to switch to low power mode. A global estimate of the non-stationary noise level is obtained by summing over the cochlear taps of the sub-band noise estimate. Since there can be some leakage of speech, the power estimate can be smoothed using a first order leaky integrator.

The noise suppressed and echo free sub-band signals are provided to modifier 412 for processing by a multiplicative mask and to reconstructor module 414 to reconstruct the sub-bands into an audio signal. A gain is then applied to at least a portion of the reconstructed signal by gain module 416 and the audio signal is provided to a codec for transmission to an output device, such as a transmitter suitable for transmitting a digital audio signal over a communication network.

Far-end signal processing module 418 processes far-end signals to enable echo cancellation, and to suppress noise in full power mode, similar to how noise suppression is performed for near-end acoustic signals such as the primary microphone signal. Far-end signal processing module 418 receives a decoded signal from a codec and processes the signal with a frequency analysis 420, feature extractor 422, source inference 424, mask generator and spectra shaping 426, modifier 428, reconstruction module 430 and gain module 432. Single microphone noise suppression as performed in module 418 is discussed in more detail in U.S. patent application Ser. No. 12/072,931 filed Feb. 29, 2008 and entitled "System and Method for Providing Single Microphone Noise Suppression Fallback," incorporated herein by reference. The resulting signal is provided to an output device 206 on audio device 104.

Power control module 312 determines whether the audio device should operate at normal power, or transition to low power mode based on a noise estimate and one or more thresholds. Noise monitoring and comparing noise against a threshold may be performed by any combination of monitor noise module 304, monitor noise module 310 and power control 312. In one embodiment during normal power mode, power control module 312 receives a primary microphone signal, secondary microphone signal, sub-band stationary noise estimate from source inference engine 408, and optionally other signals and information. If a determination is made that the audio device should operate at low power, power control module 312 sets a corresponding signal or flag, and several modules of the audio processing system are deactivated, including modules which perform noise-suppression. Operation of audio processing system 204 in low power mode is discussed in more detail below with respect to FIG. 5.

Power control module 312 may include one or more filters, comparators, and other modules. The filters may be implemented as bypass filters which approximately match the transfer function of a cochlea minimum signal path filter. The approximate match can help achieve consistency between the broadband noise estimates of the power control module and the sub-band estimates of the full noise suppression system.

Power control module 312 can determine or receive a stationary noise estimate and spatial noise estimate and determine the maximum noise level between the stationary noise estimate and the spatial noise estimate. In low power (LP) mode, the broadband noise level estimate is obtained from taking the maximum of the stationary noise estimate and the spatial noise estimate. In some embodiments, the LP mode noise estimate may be computed even when the system is in NP mode.

In NP mode, all information computed in the analysis path is available to the power control module 312 at no additional computational cost. However, in some embodiments, since the presence of echo is not supposed to affect the selection of the power mode, the audio processing system's spatial noise estimate may not be adequate. If the power management module is enabled, an identical 'shadow' estimator may be run, where the echo cancellation mask is used to gate the estimator updates. Since the noise estimate without echo may be preferred when echo cancellation is disabled, the estimation part of the envelope echo suppressor may be run regardless of the echo cancellation configuration. The echo-free sub-band system noise estimate may be converted to a broadband estimate through simple summation of sub-band energies and an additional bias compensation.

Power control module 312 receives the normal power full noise estimate and the low power full noise estimate (the maximum noise at low power) and compares each noise level to a threshold. A noise monitor within power control module 312 receives the broadband estimate as input. While in NP mode, the noise monitor within power control module 312 compares the estimate against a "turn off" threshold, while in LP mode against a "turn on" threshold. The monitor maintains a normalized counter, which is increased in the former case during NP mode if the "turn off" threshold is crossed for a particular frame. The counter is decreased in the latter at a rate that makes it reach 1 or 0, respectively, at configured times. In some embodiments, the times may be configured by setting a value for a turn off time and turn on time. When a transition occurs from one mode to another, monitor module sets a mode flag accordingly. For example, mode signal may be set to a high or "1" value for NP mode and a low or "0" value for LP mode.

When in LP mode, the spatial noise may be frozen when there is far-end activity. Setting the spatial noise to zero helps prevent contamination of the noise estimate from echo. As a result, when there is far end noise in LP mode, the stationary noise is higher than the frozen spatial noise and thereby used as the noise estimate.

Figure 5:
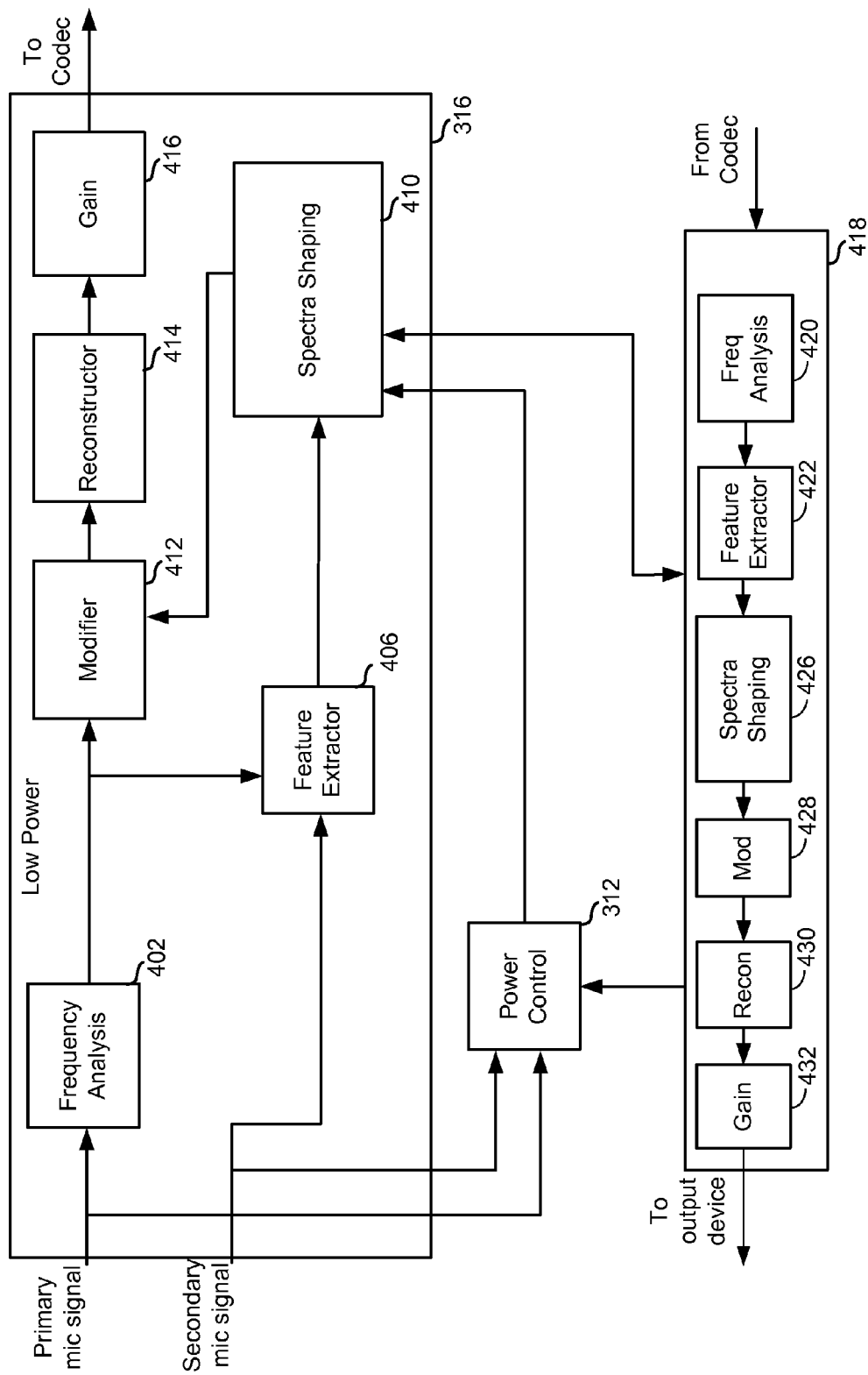
FIG. 5 is a block diagram of an exemplary low power module.

FIG. 5 is a block diagram of an exemplary low power module 316. The low power module differs from the normal power module of FIG. 4 in that source inference engine 408 is deactivated and module 410 does not perform mask generation. The deactivation of these modules results in no mask generation or noise suppression performed on the audio signals.

Signal processing is done in a broadband domain rather than sub-band domain. Echo cancellation may still be performed during low power mode, or it may be disabled. When disabled, an echo cancellation estimation component may still be operating for use in other parts of the audio processing system.

Cross fading between low power and normal power is performed in broadband domain rather than by sub-band using mask generation. When cross fading between low power mode and normal power mode, a stationary noise estimate may be initialized. Since normal power mode noise estimates are in sub-bands and low power noise estimates are in broadband, the particular noise estimate must be converted to the other mode for the initialization. For example, sub-band noise estimates may be constructed together to form a broadband noise estimate, along with a bias if needed, when fading to low power mode. When fading to normal power mode, the broadband noise can be evenly applied to the sub-bands.

Power control module 312 receives a primary microphone signal and a secondary microphone signal as well as a far-end broadband noise estimate signal from the far-end signal processing module 418. Power control module 312 may output a broadband stationary noise estimate and a broadband noise estimate signal to spectra shaping module 410 and gain module 416.

Feature extractor module 406 may determine the primary signal energy and output the energy signal to spectra shaping module 410. Spectra shaping module 410 receives the primary energy signal and a far end energy signal from far-end signal processing module 418 and provides a noise estimate signal to modifier 412.

In LP mode, the secondary microphone frequency analysis module 404 may be deactivated. The present technology achieves battery power savings in spread-microphone, close-talk scenarios by shutting down non-essential modules of an audio processing system.

Figure 6:
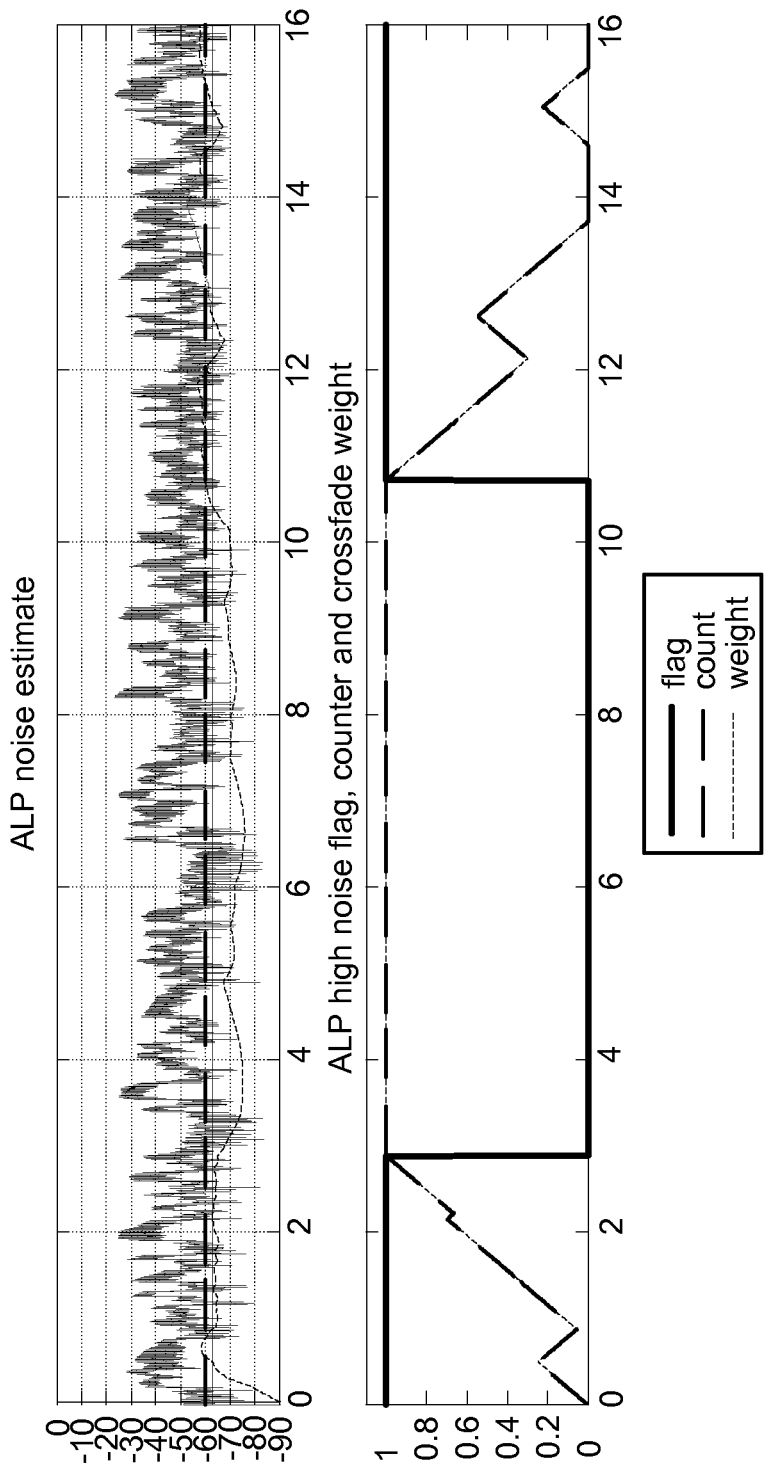
FIG. 6 illustrates noise estimate values and parameter values over time.

FIG. 6 illustrates low power mode noise estimate values and parameter values over time according to one embodiment. FIG. 6 illustrates an example for a case where two cross fade times (turn off time and turn on time) are configured to an identical two seconds. As illustrated, the audio processing system switches to LP mode at about 3 seconds, and then back to NP mode at about 10.5 seconds, based on the time that the noise estimate is above or below the corresponding threshold.

When in LP mode, the NP mode may be triggered immediately when the LP noise estimate value exceeds the "turn on" threshold. When NP mode is triggered, a noise suppression mask may be cross-faded with a mask of all-ones that is applied in the LP mode. In the case where the configured turn-on time is configured identical to the configured turn-off time, the cross-fade to a noise suppression mask of all-ones starts immediately when the turn-off threshold is crossed by the noise estimate and LP mode is entered as soon as the cross-fade is complete. In both cases, the cross-fade gain used equals the normalized power management module counter.

Figure 7:
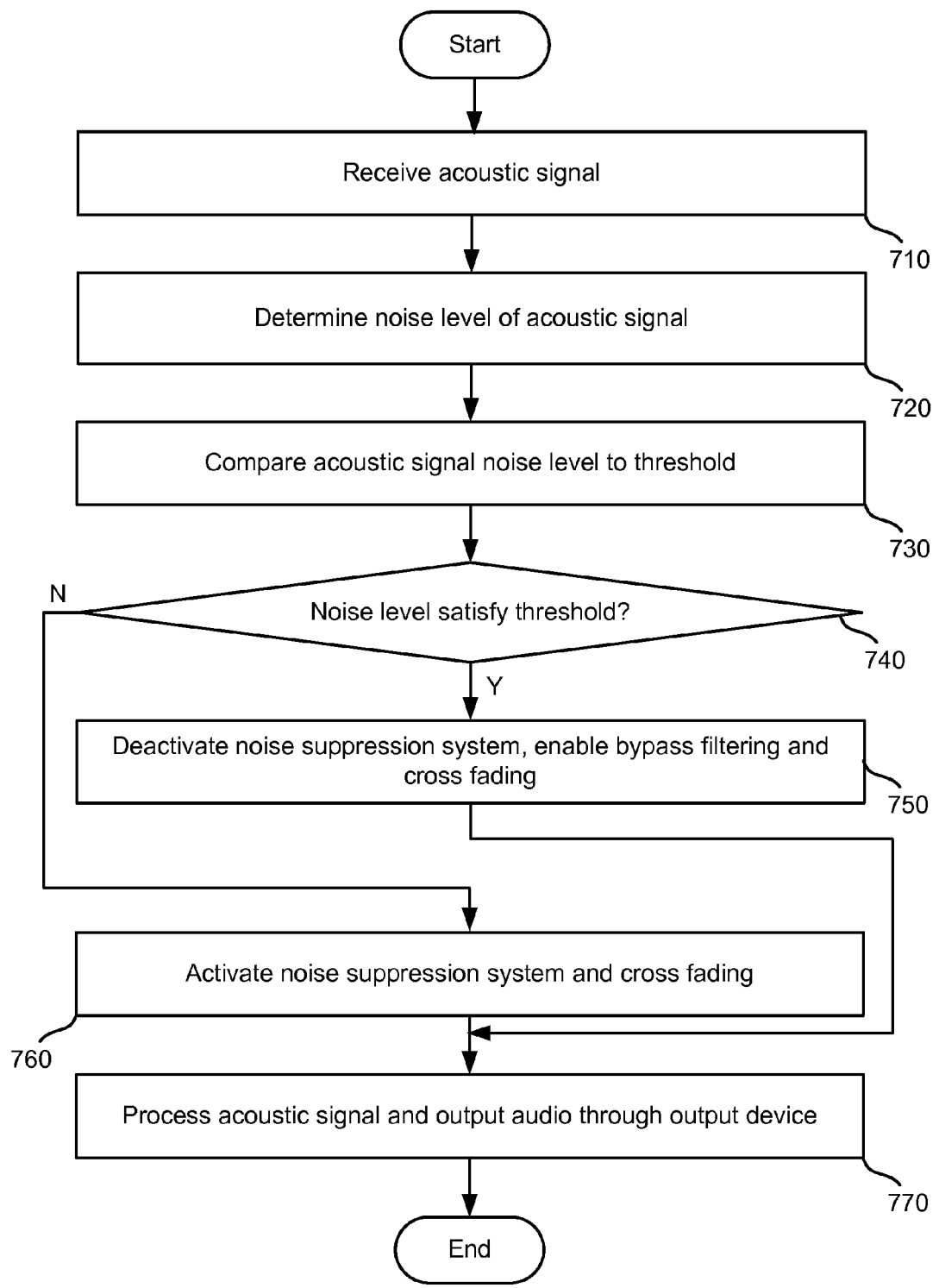
FIG. 7 is an exemplary method for adapting low power operation in an audio device.

FIG. 7 is an exemplary method for adapting low power operation in an audio device. Steps in the method depicted in FIG. 7 can be added, subtracted, combined, and/or rearranged and still fall within the scope of the present technology. In some embodiments, the audio device begins operation in a normal power mode. An acoustic signal is received by audio device 104 at step 710. The acoustic signal may be received by primary microphone 106 and secondary microphone 108. The noise level of the acoustic signal is determined at step 720. The noise level may be determined by audio processing system 204.

The acoustic signal noise level is compared to a threshold at step 730. In some embodiments, the acoustic noise level is compared to a first threshold during normal power mode and a second threshold during low power mode. Typically, the second threshold for low power mode is typically greater or equal to the first threshold in normal power mode. The comparison may be performed by a power management module of audio processing system 204.

A determination is made as to whether the noise level satisfies the threshold at step 740. In normal power mode, the noise level may initiate a mode change if the noise level is below the first threshold. In low power mode, the noise level may initiate a mode change if the noise level is greater than the second threshold.

If the noise level satisfies the threshold, a noise suppression system (e.g., noise suppressor and echo cancellation module 306) is deactivated and a bypass filter 302 and a cross fading module 314 are enabled. The deactivation of the noise suppression system is characteristic of a transition from a normal power mode to a lower power mode. In some embodiments, the deactivation and enablement are implemented when a counter reaches a particular value. The counter value may be incremented or decremented based on the average noise estimate value for a particular frame. Operation then continues to step 770 where the acoustic signal is processed and audio is output through an output device.

If the noise level does not satisfy the threshold, the noise suppression system (e.g., noise suppressor and echo cancellation module 306) and a cross fading module 314 are activated at step 760. The activation of the noise suppression system may be characteristic of a transition from a lower power mode to a normal power mode. The activation of the noise suppression system and cross fading may occur instantly when, for example, the value of the noise estimate in the lower power mode exceeds a threshold associated with the normal power mode. Operation then continues to step 770 where the acoustic signal is processed and audio is output through an output device.

FIGS. 3-5 illustrate embodiments of modules which implement an ultra low power mode, low power mode and normal power mode. During each mode, any type of module may be activated or deactivated, including noise suppression, echo cancellation, mask generation, and other modules. The modules illustrated as well as the communications between them are exemplary and additional or fewer modules may be used and/or deactivated or activated during any particular power mode. Additionally, signals and data and/or information communicated between modules may be implemented in addition to those discussed herein for exemplary embodiments.

It is noteworthy that any hardware platform suitable for performing the processing described herein is suitable for use with the technology. Computer-readable storage media refer to any medium or media that participate in providing instructions to a central processing unit (CPU) such as the processor 202 for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for adaptive power control, comprising:
monitoring noise level within a primary acoustic signal;
comparing the noise level to a threshold;
in response to the noise level being lower than the threshold:
deactivating a noise suppression system;
bypass filtering the primary acoustic signal, the bypass filtering substantially matching at least one of a magnitude and a phase response of a filter to produce a filtered primary acoustic signal; and
cross fading the filtered primary acoustic signal with an output of the noise suppression system such that the filtered primary acoustic signal is faded in and the output of the noise suppression system is faded out; and
activating the noise suppression system in response to the noise level being higher than the threshold.

2. The method of claim 1, wherein monitoring the noise level comprises using an intermediate output of the noise suppression system when the noise suppression system is active.

3. The method of claim 1, wherein the activating is performed gradually.

4. The method of claim 1, wherein the deactivating is performed gradually.

5. The method of claim 1, further comprising determining a stationary noise estimate and a spatial noise estimate.

6. The method of claim 5, wherein the spatial noise estimate is determined based on a broadband inter-aural level difference.

7. The method of claim 1, further comprising cancelling an echo in the primary acoustic signal.

8. The method of claim 1, further comprising in response to the noise level being lower than the threshold:
deactivating frequency processing components and activating time-domain components; and
monitoring a noise estimate for the primary acoustic signal in a time domain to determine if the noise estimate is higher than a second threshold.

9. The method of claim 1, wherein upon deactivating or activating the noise suppression system, a current noise estimate for a first bandwidth is generated from a previous noise estimate with a different bandwidth than the first bandwidth.

10. The method of claim 9, further comprising cross fading an audio signal using a mask in a frequency domain, wherein upon activating noise suppression, sub-band noise estimates are generated from a broadband noise estimate.

11. The method of claim 9, the cross fading being performed in a time domain.

12. The method of claim 1, wherein comparing includes comparing the noise level to a first threshold to determine if the deactivated noise suppression system should be activated and comparing the noise level to a second threshold to determine if the active noise suppression system should be deactivated.

13. A non-transitory computer readable storage medium having embodied thereon a program, the program executable by a processor to perform a method for adaptive power control, the method comprising:
monitoring noise level within a primary acoustic signal;
comparing the noise level to a threshold;
in response to the noise level being lower than the threshold:
deactivating a noise suppression system;
bypass filtering the primary acoustic signal, the bypass filtering substantially matching at least one of a magnitude and a phase response of a filter to produce a filtered primary acoustic signal; and
cross fading the filtered primary acoustic signal with an output of the noise suppression system such that the filtered primary acoustic signal is faded in and the output of the noise suppression system is faded out; and
activating the noise suppression system in response to the noise level being higher than the threshold.

14. The non-transitory computer readable storage medium of claim 13, wherein monitoring the noise level comprises using an intermediate output of the noise suppression system when the noise suppression system is active.

15. The non-transitory computer readable storage medium of claim 13, wherein the activating is performed gradually.

16. The non-transitory computer readable storage medium of claim 13, wherein the deactivating is performed gradually.

17. The non-transitory computer readable storage medium of claim 13, wherein the method further includes determining a stationary noise estimate and a spatial noise estimate.

18. The non-transitory computer readable storage medium of claim 13, wherein upon deactivating or activating the noise suppression system, a current noise estimate for a first bandwidth is generated from a previous noise estimate with a different bandwidth than the first bandwidth.

19. The non-transitory computer readable storage medium of claim 18, wherein upon activating noise suppression, sub-band noise estimates are generated from a broadband noise estimate.

20. The non-transitory computer readable storage medium of claim 18, wherein upon deactivating noise suppression, a broadband noise estimate is generated from sub-band noise estimates.

21. The non-transitory computer readable storage medium of claim 13, wherein comparing includes comparing the noise level to a first threshold to determine if the deactivated noise suppression system should be activated and comparing the noise level to a second threshold to determine if the active noise suppression system should be deactivated.

22. A system for adaptive power control, the system comprising:
a primary microphone configured to receive an acoustic signal;
a noise suppression module configured to be executed by a processor to receive a noise estimate, the noise estimate being based on the acoustic signal, and process the acoustic signal based on the noise estimate; and
a power management module configured to be executed by a processor to:
in response to the noise estimate being lower than a threshold:

deactivate the noise suppression module by the processor;

bypass filter the primary acoustic signal by the processor, the bypass filter substantially matching at least one of a magnitude and a phase response of a filter to produce a filtered primary acoustic signal; and cross fade the filtered primary acoustic signal with an output of the noise suppression module by the processor such that the filtered primary acoustic signal is faded in and the output of the noise suppression module is faded out; and activate the noise suppression module by the processor in response to the noise estimate being higher than the threshold.

23. The system of claim 22, wherein the power management module includes a noise estimate monitoring module configured to compare the noise estimate to the threshold.

* * * * *